Dec. 4, 1934.　　　M. J. WEBER　　　1,982,939
PLATFORM SCALE
Filed Oct. 17, 1932　　2 Sheets-Sheet 1
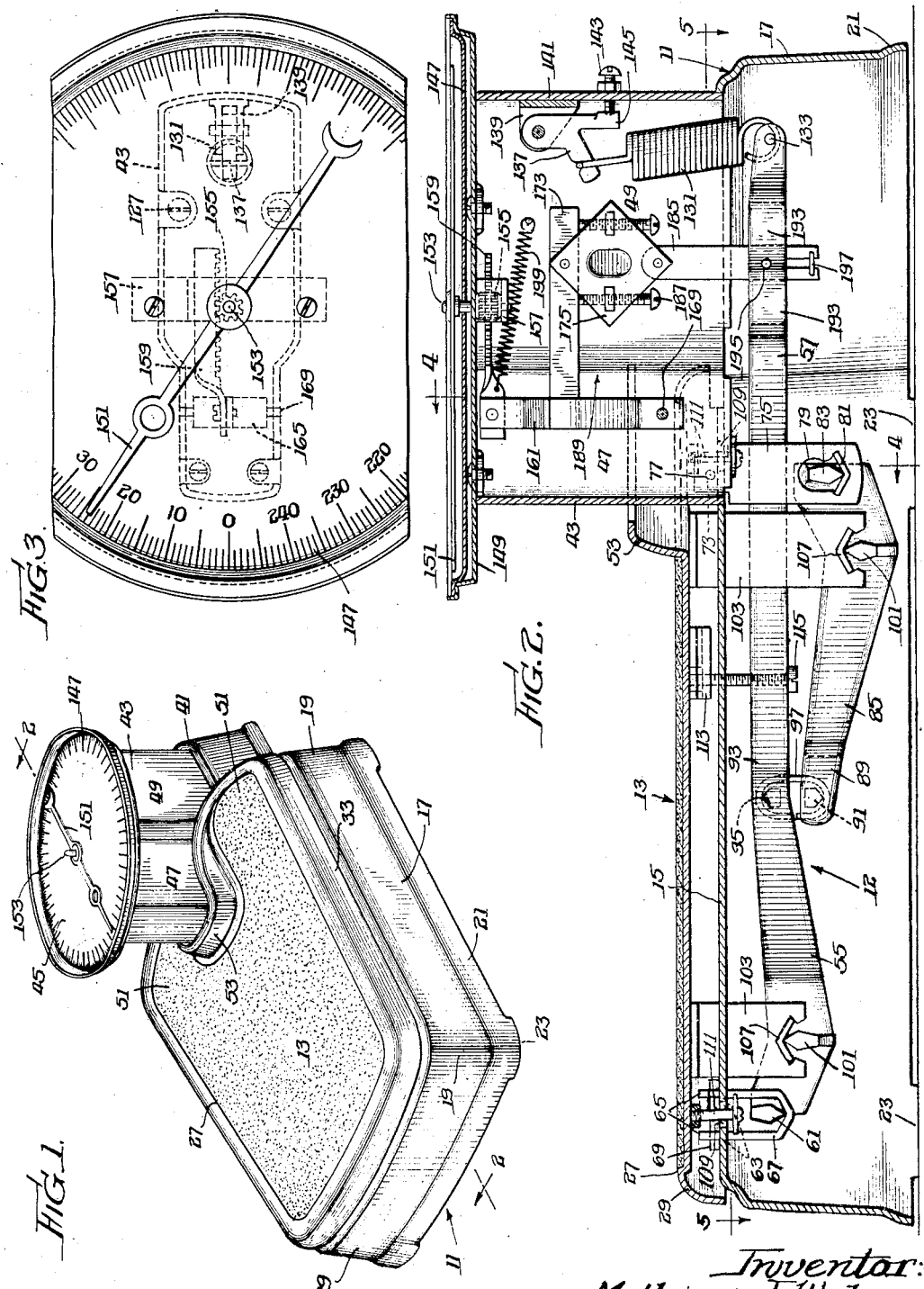
Inventor:
Mathias J. Weber,
By:- Cox & Moore attys.

Dec. 4, 1934.　　M. J. WEBER　　1,982,939
PLATFORM SCALE
Filed Oct. 17, 1932　　2 Sheets-Sheet 2
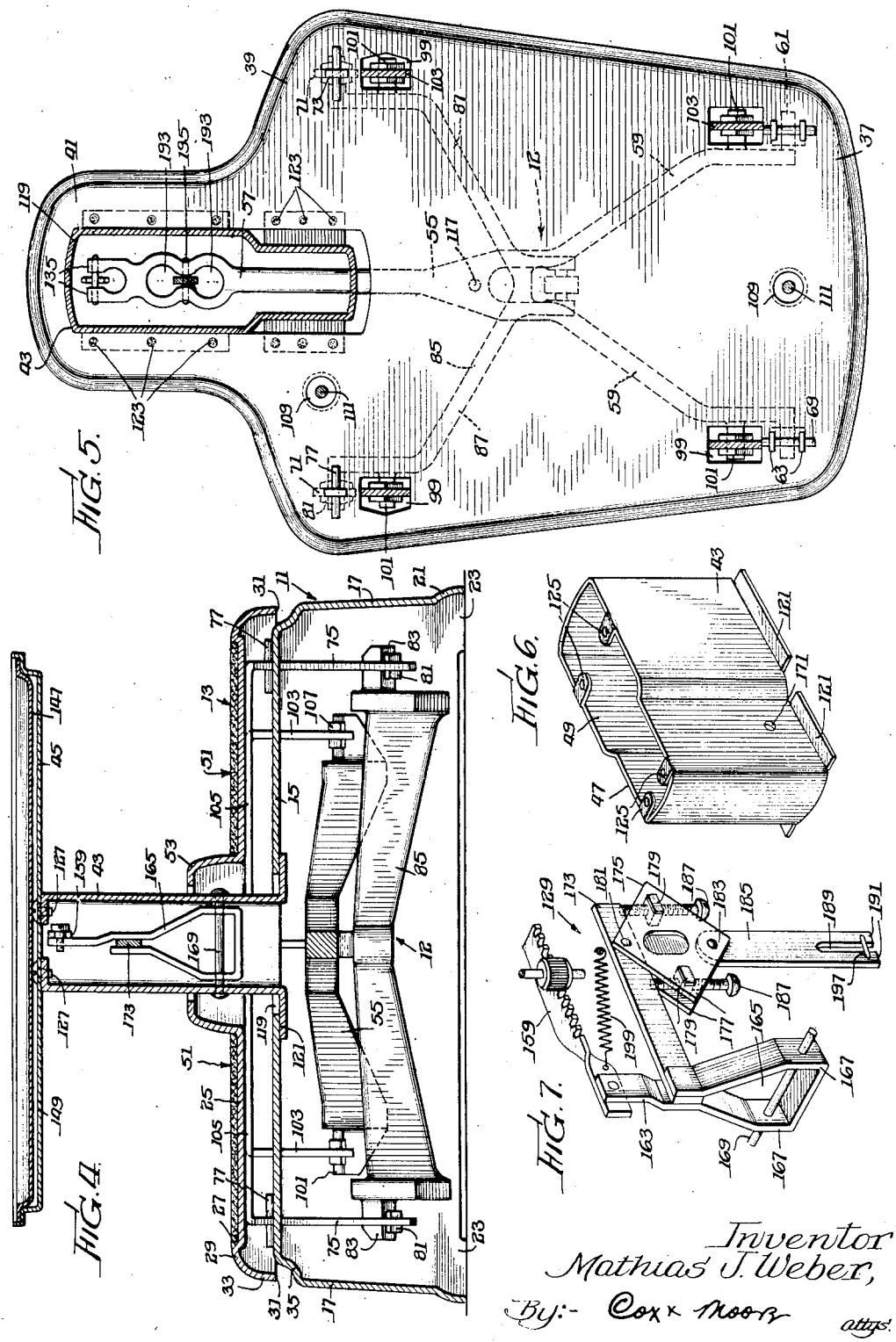
Inventor
Mathias J. Weber,
By:- Cox & Moore　attys.

Patented Dec. 4, 1934

1,982,939

UNITED STATES PATENT OFFICE 1,982,939

PLATFORM SCALE

Mathias J. Weber, Chicago, Ill., assignor, by mesne assignments, to Continental Scale Works, Chicago, Ill., a corporation of Illinois Application October 17, 1932, Serial No. 638,071

15 Claims. (Cl. 265—68)

My invention relates in general to weighing scales and has more particular reference to platform scales, especially those having a scale dial and built close to the floor for convenient use.

An important object of the invention is to provide a platform scale, of inexpensive construction and having great space efficiency.

Another important object is to provide a low platform scale which can be conveniently stepped on by the user.

Another important object is to provide a scale construction which can be easily assembled and easily adjusted after assembly, which is efficient in operation and which can be readily and economically manufactured.

Another object is to provide a scale having a sheet metal frame, which is strong and rigid and which is so arranged that the frame parts do not deflect in use to cause inaccurate weight indications.

Another object is to provide a scale having a dial and simple, yet positive and accurate mechanism for calibrating the weighing mechanism to register correctly and for setting the dial indicator.

Another object is to provide a scale having a drawn sheet metal base or frame on which the weighing mechanism is rigidly mounted.

Among the other numerous advantages are to provide a weighing device having a sheet metal frame in which the weighing mechanism is mounted in such fashion that inaccuracies due to deflection of the frame due to the weight, are reduced to a minimum; a scale which is unusually light and inexpensive, due to the use of sheet metal in the frame and to the novel arrangement of parts whereby assembly and adjustment is facilitated but which is nevertheless serviceable and accurate in use; a platform scale having a dial overhanging the weighing platform, which is extended beneath the dial on either side of the dial support to increase the standing room on the platform; a dial scale having a sheet metal frame in which the weighing mechanism is mounted and in which the dial is carried on a sheet metal extension of the frame which projects above the scale platform and forms a housing for novel calibrating mechanism for adjusting the weight recording devices for accurate registration; a platform scale having novel dial calibrating and setting means of relatively flat arrangement and housed in a relatively thin scale casing extension; and in general to improve the manufacture of devices of the character mentioned by simplifying the design, cheapening the product without sacrificing its operating efficiency, simplifying the assembly and adjustment of the device and utilizing light and inexpensive materials in a manner to provide adequate strength and rigidity in the finished product.

Numerous other objects and advantages of the invention will become apparent as the same is more fully understood from the following description which, taken with the accompanying drawings, discloses a preferred form for the purpose of illustrating the invention.

Referring to the drawings:

Figure 1 is a perspective view of a weighing scale embodying my present invention;

Figure 2 is a vertical section taken substantially along the line 2—2 in Figure 1;

Figure 3 is a fragmentary plan view of the dial of the scale;

Figure 4 is a vertical section taken substantially along the line 4—4 in Figure 2;

Figure 5 is a horizontal section taken substantially along the line 5—5 in Figure 2;

Figure 6 is a perspective view of the part of the scale casing; and

Figure 7 is a perspective view of parts of the scale mechanism, which are housed in the casing portion shown in Figure 6.

To illustrate my invention, I have shown on the drawings, a scale comprising a relatively low housing 11 forming a frame comprising a base in which is mounted a train of levers 12, carrying a scale platform 13.

The housing 11 is preferably formed of drawn sheet metal having a relatively flat top wall 15 and integral side walls 17 depending at the edges of the top wall and preferably flaring slightly outwardly. At their meeting end edges, the walls merge together to form curved corners 19 and the lower edges of the side walls are formed with a slightly curved bead 21 to improve the appearance of the housing and increase its rigidity, the lower edges of the side walls also are provided with downwardly extending projections 23 opposite the curved corners 19 to provide legs on which the casing is supported. The platform is also preferably formed as a drawn sheet metal piece having a flat platform surface 25 provided, along its edges, with an upwardly extending bead 27 and downwardly curled flanges 29 outwardly of the bead, the terminal edges 31 of the flanges 29 normally lying substantially in the plane of the top wall 15 of the housing 11, and the lower portions 33 of the flanges 29 lying substantially in the plane of the side walls 17.

The casing 11 is provided with an indented groove 35 at the meeting edges of the top and side walls to receive the terminal portions of the flanges 29 as the platform moves vertically on the casing during weighing operations. The groove 35 not only receives the edges of the flanges 29 and thus improves the appearance of the platform scale but also materially increases the rigidity of the housing.

A sheet of linoleum or other suitable cover material may be and preferably is secured to the top of the platform within the bead 27.

The entire construction of the housing 11 is adapted to provide rigidity in order to eliminate deflection when the device is heavily loaded while, at the same time, maintaining an attractive appearance. This is accomplished by the downward and outward flare of the side walls 17, the curved corner construction 19, the beaded construction 21 and the grooves 35. Distortion of the housing under heavy loads is also avoided by supporting the train of levers 12 on the top wall as close to the corners 19 as possible.

The housing 11 is wide in its forward portions 37—39 and, in its rearmost portions 41, is of reduced width providing a flask-like appearance clearly illustrated in Figure 5 of the drawings. The platform 13 overlies the forward portions of the housing while the rearward portions 41 carry an extension of the housing, said extension forming an auxiliary frame or casing 43, which extends from the housing 11 substantially above the platform 13 and carries preferably upwardly facing weight registering means 45 in position to be readily viewed by the person standing on the platform.

The casing portion 43 is of relatively narrow construction as shown in Figure 6 of the drawings and its forward portions 47 are relatively narrower in width than its rearmost portions 49. The forward portions 47 of the casing extend forwardly of the hindmost end of the widest portion 39 of the casing 11 and the scale platform 13, at its rearmost portion, embraces and extends on either side of the front end of the casing 43 as shown at 51 in Figure 1 of the drawings. The platform carries an upstanding flange 53 for the purpose of improving the appearance of the platform by giving an impression of support for the base of the housing 43 and to protect the base of the housing 43 from the kicks of persons standing on the platform. The forward portions of the platform are wide enough to receive the heels of and the platform is long enough to accommodate the foot of a person standing on the platform, the balls of the feet extending on either side of the housing 43.

The scale thus embodies an especially compact arrangement since the dial-supporting column is folded into the platform and extends between the feet of the person using the scale in such a way as to conserve space.

The train of levers 12 includes a relatively elongated member 55 having a portion 57 extending into the rearmost portions 41 of the casing underlying the housing 43 and having forked arms 59 extending to the forward corners of the casing 11 and provided with knife edges 61 at the extremities of the arms whereby to tiltably support the same in the forward portions of the casing 11 so that the portions 57 may move in a vertical plane beneath the housing 43.

The ends of the arms 59 are preferably hung at or near the corners of the casing from the top wall 15, which is perforated at 63 near the forward casing corners 37 to receive the arms 65 of the U-shaped stirrup 67, which arms are perforated to receive a bearing pin 69, which rests upon the upper surface of the top wall 15 between the perforations 63 and rolls thereon to permit slight tilting movement of the stirrup on the casing. The lower portions of the stirrup hang beneath the wall 15 and provide seats for the knife edges 61.

The top wall 15 is also provided with elongated perforations 71 near the rearward corners 39 of the casing to receive the upper ends 73 of hanger plates or stirrups 75, said upper portions 73 extending above the wall and being provided with pivot pins 77 which rest upon and roll upon the upper surface of the wall 15 to tiltingly support the members 75 on the casing. The lower portions of the members 75 are provided with openings 79 and flanged portions 81 providing seats for receiving knife edges 83 formed at the terminal ends of the arms 87 of a lever member 85, which, in conjunction with the lever member 55, forms the train of levers 12. The forward end 89 of the lever member 85 underlies the portion 93 of the lever member 55, where the arms 59 thereof are connected together and to the lever portion 57, and the member 55 is provided with a downwardly facing knife edge 91. The lever 55 also carries an upwardly facing knife edge 95 opposite the knife edge 91 and the two knife edges are connected together by means of the stirrup link 97.

The top wall 15 is provided with openings 99 adjacent the ends of the arms 59 and 87, which arms are provided, near the knife edges 61 and 83, with upwardly facing knife edges 101 disposed substantially vertically beneath the openings 99.

The platform 13 is provided with depending legs 103 preferably formed of sheet metal strips, the central portions 105 of which underlie and are secured to the platform by any suitable or convenient means, such as welding, in order to improve the strength and rigidity of the sheet metal platform and the opposite ends of the sheet metal strips are bent to project downwardly of the underside of the platform to form the legs 103. The lower ends of the legs 103 are notched and provided with seats 107 for the knife edges 101 so that the platform is mounted on the train of levers 12 in a manner permitting detachment of the platform by simply lifting it vertically to disengage the seats 107 from the knife edges 101 and to withdraw the arms 103 through the openings 99, which are of sufficient size to permit the arms and the seats 107 to pass therethrough.

In order to prevent the platform from being accidentally dismounted from the structure in this manner, the platform may be provided with threaded bosses 109, one preferably in the forward portion and the other in one of the rearward portions of the platform and the top wall 15 is provided with corresponding openings to permit holding screws 111 to pass therethrough and thread into the boss 109, the heads of the holding screws remaining below the top wall 15 in position to engage the same to prevent removal of the platform unless the holding screws are first removed from the bosses. In order to firmly lock the platform on the scale, as, for instance, during transportation, the platform is provided with additional means 113 for threadingly engaging the end of a locking screw 115 which extends in a suitable opening in the top wall 15 and through an opening 117 in the lever 55.

By snugly screwing the platform and the train of levers 12 together, the same may be locked against movement in the casing.

The top wall 15 is provided at its rearmost portions with an elongated opening 119 to receive the casing portion 43, which is preferably formed as a separate part and assembled on the housing 11, the casing portion 43 having flanges 121 extending outwardly of its lowermost edges and adapted to engage the underside of the top wall 15 at the opening 119. The flanges are secured to the top wall of the casing 11 in any suitable fashion and preferably by means of spot-welding 123 and the walls of the casing 43 extending upwardly through the opening 119 substantially above the platform 13 and are preferably provided with inwardly extending screw threaded lugs 125 to receive the fastening members 127 by which the dial 45 is secured at the upper edge of the housing.

The housing 43 is adapted to enclose dial operating mechanism 129, which is shown in Figures 2 and 7 of the drawings and which is adapted to actuate the dial to give a weight indication in response to the deposition of a weight upon the platform, the mechanism 129 having an operative connection with the dial and with the vertically shiftable end 57 of the lever 55.

The end of the lever is adapted to be moved downwardly under the influence of a weight supported on the platform, said downward movement being resisted by means of a weighing spring 131, the lower end of which is connected to a pin 133 mounted between the forked ends 135 of the lever 55 and the upper end of which is secured to an adjusting member 137, which preferably comprises a lever pivoted in a frame 139 secured as by spot-welding 141 to the rear wall of the housing 43, said rear wall, below the mounting 139, being provided with a threaded opening for the reception of an adjusting screw 143, the outer end of which is provided for engagement with a turning instrument, such as a screw driver, and the inner end of which bears against a portion 145 of the lever 137 so that by turning the screw 143 from outside of the housing, the tension of the weighing spring 131, may be adjusted. The movement of the lever 55 against the resistance of the spring 131 is proportional to the amount of the weight on the platform and this movement, being transferred to the weight registering dial by means of the mechanism 129, provides for measuring the weight applied to the platform.

Any desired or preferred form of dial may be incorporated but I prefer a plate-like dial carrying a circular card 147, the edges of which are graduated in suitable weight units and the card is mounted in a preferably sheet metal saucer 149, which is secured to the upper end of the casing 43. The dial includes a pointer 151, which is mounted on a stub shaft 153 extending upwardly and centrally of the saucer and the graduated card, the pointer having a tip adapted to sweep around the edge of the card adjacent the weight graduations. The lower end of the stub shaft 153 extends below the bottom of the saucer 149 and is formed with a pinion 155 and is journalled in a suitable bracket 157 mounted on the bottom of the saucer. The mechanism 129 includes a rack 159 which drivingly engages the pinion 155 and which is pivoted on a lever member 161 of peculiar construction. The member 161 comprises a strip 163, to the upper end of which the rack is pivoted, the lower portions of the member being formed as a relatively wide loop 165, the sides 167 of which are substantially vertical and perforated for pivotal engagement with a bar 169, which is mounted between the side walls of the lower portion 49 of the casing 43, said side walls being perforated as at 171 to receive and support the bar 169. The member 161 also includes a horizontal arm 173 which extends rearwardly of the looped strip 163 at a point slightly below the point on which the rack is pivotally supported. The arm 173 has a device or fitting 175 comprising a pair of spaced plates 177 which are connected together by means of the spacing blocks 179. The plates 177 are preferably square and their upper corners extend on opposite sides of the arm 173 and are pivoted thereto by means of the pin 181. The corners of the plates, diagonally opposite to the corners pivoted to the arm 173, are pivoted by means of a pin 183 to the upper end of a link 185. The blocks 179 are located at the corners of the plates 177 intermediate the corners pivoted to the arm 173 and to the member 185 and carry adjusting screws 187 threaded through the blocks with the upper ends of the screws bearing upon the lower edge of the arm 173 on opposite sides of the pivot pin 181 so that by tightening one screw and loosening the other, the angularity of the fitting 175, with respect to the arms 173, may be adjusted.

The link 185 comprises a strip, the lower end of which is provided with a longitudinal slot 189 defined by the spaced arms 191. The end 57 of the lever 55 also is provided with an opening comprising spaced, relatively wide, portions 193 connected together by a relatively narrow neck portion, which carries a pin 195 and the lower slotted portion of the link 185 is adapted to extend in the lever opening with the pin 195 extending in the slot 189 and the arms 191 straddling the pin and extending therebelow. The lower extremities of the arms 191 are connected together by means of a closure member 197, which may be a short length of wire mounted through perforations formed in the end of the arms. This arrangement permits the link 185 to be easily assembled on the pin and permits the pin to move in the slot 189 between the bottom thereof and the closure member 197 for a purpose which will hereinafter be more fully explained.

The rack 159 engages the pinion on one side of the stub shaft 153 and a spring 199 is utilized to maintain the rack resiliently engaging the pinion, the spring being connected, at one end, to the rack, and, at the other end, to the walls of the casing 43 at such a point as to normally urge the rack against the pinion and also longitudinally in a direction to urge the pinion and the dial pointer to zero reading. That is to say, the spring 199 is constantly urging the member 161 on its pivot pin 169 in a clockwise direction, viewing Figure 2 of the drawings, so that the outermost end of the arm 173 is normally urged downwardly and the link 185 is urged downwardly against the pin 195 carried by the lever. The tension of the spring 131 is adjusted so that when there is no weight on the platform, the lever 55, through the agency of its pin 195 will support the dial actuating mechanism against the tension of the spring 199 in a position such that the dial registers zero weight.

When a weight is applied to the platform, the spring 131 will be extended and the end 57 of the lever will be depressed. The link 185, under the influence of the spring 199, will follow the pin downwardly, permitting the rack 159 to turn the dial to a position indicating the amount of weight on the platform.

In order to calibrate the dial for correct registration throughout its entire range, the angularity of the fitting 175 may be adjusted in order to change the effective length of the lever arm 173. If the scale registers less than the actual weight applied to the platform, the effective length of the lever arm may be reduced to thereby increase the reading by loosening the left hand screw 187 and tightening the right hand screw, viewing Figure 2 of the drawings. If the weight registered is higher than the actual weight applied to the platform, the effective length of the lever arm may be increased in order to calibrate the mechanism for correct registration by loosening the right hand screw and tightening the left hand screw 187. The purpose of the lost motion, permitted by the elongated slot 189, is to permit the relatively delicate scale mechanism 129 to overtravel if the scale is abused by the sudden jarring application of heavy weights to the scale platform. If the end 57 of the lever 55 is suddenly depressed in this fashion, the pin may leave the bottom of the slot and the mechanism 129 will follow in due course without being suddenly jerked to the registering position.

The scale of my present invention is neat and compact, has great space efficiency, is of sightly appearance, is of light inexpensive construction and yet the flimsy sheet metal parts are formed in such a way as to provide adequate rigidity in order to guard against deflection and hence is in correct registration when heavy weights are applied.

The scale mechanism has a double adjustment feature whereby the scale may be adjusted to give a correct zero registration and may also be calibrated for accurate weight registration throughout its entire range by means of the tilting fitting 175, it being apparent that the openings 193 of the lever 55, which are opposite the ends of the screws 187, will permit the end of a screw driver, or other suitable turning instrument, to be inserted through the lever in position to engage the downwardly facing heads of the screws.

It is thought that the invention and numerous of its attendant advantages will be understood from the foregoing description and it is obvious that numerous changes may be made in the form, construction, and arrangement of the several parts without departing from the spirit or scope of my invention, or sacrificing any of its attendant advantages, the form herein described being a preferred embodiment for the purpose of illustrating my invention.

Having thus described my invention, what I claim as new and desire to secure by Letters Patent is as follows:

1. A scale comprising a frame, an indicator, a weighing platform and means for actuating the indicator in response to the weight of an article supported on the platform, said means comprising a swingable device yieldingly supported on the frame and operatively connected to the platform, a tilting member operatively connected with the indicator, an adjustable device pivotally carried by said tilting member, means to adjust the angularity of the adjustable device with respect to said tilting member and a link pivotally connecting the adjustable device and the swingable device, said link having a lost-motion connection with one of said devices.

2. A scale comprising means forming a weighing mechanism, having a member movable in response to the application of a weight to be measured on the scale, a weight indicator and means to move the indicator in response to the movement of the member, said member having a pin and said means having a pronged part straddling the pin with its prongs extending substantially beyond the pin, whereby the pin may normally seat itself on and transmit thrust axially to the part, at the base of the prongs, and may leave its seat and travel a limited distance toward the ends of the prongs and means at the ends of the prongs for preventing the pin from moving therebeyond.

3. A scale comprising a frame, an indicator and a weighing platform on said frame, and means for actuating the indicator in response to the weight of an article supported on the platform, said means comprising a shaft on said frame and a tiltable member on said shaft, said tiltable member comprising a strip bent to provide spaced apart perforated portions forming journals through which the shaft extends, at least one of said perforated portions extending to provide an arm and a second strip secured to said arm and extending therefrom to form a second arm making an approximate right angle with said first named arm, means to connect one of said arms to the weighing platform and to drivingly connect the other arm with the indicator.

4. A scale comprising a frame, an indicator, a weighing platform, and means for actuating the indicator in response to the weight of an article supported on the platform, said means comprising a shaft carried by the base, a tiltable member journalled on said shaft and having an arm operatively connected with the platform and an arm drivingly connected with the indicator, one of said arms comprising a bent strip providing spaced-apart perforated portions, forming journals receiving said shaft at relatively widely spaced points to tiltably mount the member thereon while preventing wabbling of said member.

5. A weighing scale having a frame provided with an indicator, weighing mechanism in the frame including a weighing lever having a fulcrum on the frame, and adapted to be tilted in said frame by the weight to be measured, and a coiled spring connected between the frame and said weighing lever at a point spaced from said fulcrum for resisting movement of the weighing lever about its fulcrum under the influence of the weight to be measured, a bell crank lever pivoted in said frame, a link pivotally connected at one end with the bell crank lever and connected at its opposite end to said weighing lever between its fulcrum and the point at which said coiled spring is attached, said bell crank lever being operatively connected for actuating said indicator, and adjustable means in the connection between the weighing lever and the bell crank lever for adjusting the effective length of one of said levers.

6. A weighing scale having a frame provided with an indicator, weighing mechanism in the frame including a weighing lever having a fulcrum on the frame and adapted to be tilted in said frame by a weight to be measured and a coiled spring connected between the frame and said weighing lever at a point spaced from said fulcrum in order to resist movement of the weighing lever about its fulcrum under the influence of the weight, a bell crank lever pivoted in said frame, a link pivotally connected at one end with the bell crank lever and connected at its opposite end to said weighing lever between its fulcrum and the point at which said coiled spring is attached, said bell crank lever being operatively connected for actuating said indicator and adjustable means in the connection between the weighing lever and the bell crank lever for adjusting the effective length of one of said levers, one of said levers having a pin and the link having a slot providing a seat at one end of the slot for receiving said pin whereby the pin may transmit thrust from the lever longitudinally in one direction to said link and may leave its seat and travel in said slot in the opposite direction without transmitting thrust to said link whereby to prevent sudden shocks, imparted to said weighing lever, from being transferred to said bell crank lever.

7. A scale comprising a frame provided with an indicator having a driving pinion, weighing mechanism in the frame comprising a weighing lever having a fulcrum in the frame and adapted to be tilted by the weight to be measured, means operatively associated with the lever to resist tilting movement of the lever about its fulcrum under the influence of the weight, a horizontal shaft in said frame, a bell crank lever mounted on said shaft for pivotal movement in a plane normal to the axis of said shaft, said bell crank having a pair of relatively widely spaced portions connected to said shaft to prevent wabbling of the bell crank during its pivotal movement, means co-operatively associated with said bell crank to move the same in response to the movement of said weighing lever, a rack connected to said bell crank lever in position to operatively engage said pinion for actuating the indicator, and a coiled spring connected at one end to the rack and at its other end to the frame on the side of the pinion remote from the rack whereby to resiliently urge the rack into engagement with the pinion and eliminate back lash and also to urge the bell crank in a direction to exert pressure on the weighing lever in order to eliminate lost motion in all of the connections between the rack and the weighing lever.

8. A weighing scale comprising a frame, an indicator on said frame, weighing mechanism in said frame comprising a lever extending longitudinally of and having a fulcrum on said frame for tilting movement in a vertical plane in response to the weight to be measured, a spring operatively connected between said frame and lever to resist movement of the lever under the influence of the weight, a bell crank to operate the indicator in response to the movement of the lever comprising a strip of sheet metal forming an arm and bent to provide spaced portions forming supports and including a sheet metal piece connected to said strip in position forming an arm extending substantially normal to the first mentioned arm, a shaft carried horizontally in the frame, said supports being mounted in spaced position on said shaft to carry the bell crank for tilting, non-wabbling movement about the axis of said shaft, means urging the bell crank in one direction about said axis, means drivingly connecting one of said arms with the indicator and means connected to the other arm and extending to and bearing on said lever so that the angular position of the bell crank is determined by the position assumed by the lever under the influence of a weight.

9. A weighing scale comprising a frame, an indicator on said frame, weighing mechanism in said frame comprising a lever extending longitudinally of and having a fulcrum on said frame for tilting movement in a vertical plane in response to the weight to be measured, a spring operatively connected between said frame and lever to resist movement of the lever under the influence of the weight, a bell crank to operate the indicator in response to the movement of the lever comprising a strip of sheet metal forming an arm and bent to provide spaced portions forming supports and including a sheet metal piece connected to said strip in position forming an arm extending substantially normal to the first mentioned arm, a shaft carried horizontally in the frame, said supports being mounted in spaced position on said shaft to carry the bell crank for tilting, non-wabbling movement about the axis of said shaft, a pinion for driving the indicator, a rack engaging the pinion and connected to one of said arms of the bell crank, means connected to the other arm of said bell crank and extending to and bearing on said lever so that the angular position of the bell crank is determined by the position of the lever, and resilient means carried by and between the frame and the rack for urging the rack into resilient engagement with the pinion and in a longitudinal direction to eliminate back lash between rack and pinion, and lost motion between rack, bell crank, and lever.

10. A scale comprising means forming a weighing mechanism having a shiftable device movable in response to the application of a weight to be measured, a weight indicator, and means including a movable device to actuate the indicator in response to the movement of the shiftable device, one of said devices carrying a pin, a link connected to the other device and having a slotted part receiving the pin whereby the pin may normally seat itself on and transmit thrust axially to the link at one end of the slot and may leave its seat and travel in the slot away from said seat in order to provide a lost motion connection between said devices in order to protect the indicator actuating means from sudden jars initiated in the weighing mechanism.

11. A scale comprising a movable member shiftable in response to the deposition of a weight to be measured on the scale, said member having an opening defining relatively wide portions and a narrow portion connecting the wide portions, indicator actuating means having a connecting portion pivoted to the movable member in the narrow portion of said opening, turnable members on said indicator actuating mechanism, said indicator actuating mechanism being actuated by the turnable members to adjust the indicator, said turnable members being disposed opposite the relatively wide portions of said opening to permit the same to be turned by means of a turning implement inserted through the relatively wide portions of said opening on opposite sides of said connecting portion.

12. A scale comprising a housing forming a frame, weighing mechanism carried by said frame and including a platform overlying said frame, said frame having a tubular housing extending above the platform, weight-indicating means carried by said tubular housing substantially above said platform, and means within said housing and comprising a tiltable lever operatively connected for movement in response to the deposition of a weight on said platform for actuating said indicating means, means formed on said housing affording spaced apart supports, a shaft mounted on and extending between said supports, said tiltable lever being formed with spaced portions mounted on said shaft adjacent said supports whereby said tiltable lever is carried on said shaft for movement in a substantially vertical plane.

13. A scale comprising a frame, a weighing platform carried on said frame, said frame having a tubular extension projecting above said platform, an indicator on said tubular extension and actuating means for moving the indicator in response to a weight on said platform, means on said tubular extension forming spaced support portions having perforations, a shaft carried in said perforations and supported by and between said spaced support portions, said actuating means comprising a tiltable member having spaced portions tiltably mounted on the shaft adjacent the spaced support portions in order to prevent wabbling of the tiltable member therebetween, said tiltable member being formed with a plurality of arms, and means to connect one of said arms with the weighing platform and another with the indicator.

14. A scale comprising a frame, an indicator on the frame, a weight receiving platform, means carried on the frame for actuating the indicator, said means comprising a sheet metal member tiltable in response to the application of the weight of an article on the platform, and having an arm operatively connected to the indicator, a shaft carried by the frame, said tiltable sheet metal member being journalled at relatively widely spaced points whereby to tiltably support the sheet metal member on the shaft without wabbling, and said frame having spaced support portions receiving said shaft on opposite sides of said sheet metal member adjacent the relatively widely spaced points at which said member is journalled on the shaft.

15. A scale comprising a frame, means forming a weighing mechanism comprising a lever tiltably mounted on said frame, a weighing platform carried by said lever, and yielding means comprising a spring connected to said frame and operatively associated with the lever to counterbalance a weight on the platform, weight-indicating means carried by said frame, and a member tiltable on said frame and operatively connected with said indicating means, said member having an arm, a link pivotally connected to the arm and to the lever, and means to change the effective length of said arm whereby to vary the turning movement imparted to the member by the lever and thus provide for adjusting the indicator to the spring, said link providing a lost-motion connection between said arm and said lever whereby to protect the indicating means from the effects of shocks initiated in said weighing mechanism.

MATHIAS J. WEBER.